United States Patent [19]

Lee

[11] Patent Number: 5,766,661

[45] Date of Patent: Jun. 16, 1998

[54] METHOD FOR CONTROLLING A RICE COOKER TO EVENLY DISTRIBUTE RICE THEREIN

[75] Inventor: Jae-Bong Lee, Seoul, Rep. of Korea

[73] Assignee: Samsung Electronics Co., Ltd., Suwon, Rep. of Korea

[21] Appl. No.: 543,751

[22] Filed: Oct. 16, 1995

[30] Foreign Application Priority Data

Oct. 17, 1994 [KR] Rep. of Korea ............ 1994-26546

[51] Int. Cl.⁶ .................................................. G01N 33/02
[52] U.S. Cl. ............................ 426/231; 426/233; 426/508;
426/523; 219/389; 219/433; 219/435; 219/441;
219/442; 99/331; 99/333; 99/348
[58] Field of Search ............................ 426/231, 233,
426/508, 523; 219/389, 433, 435, 441,
442; 99/331, 333, 348

[56] References Cited

U.S. PATENT DOCUMENTS

| | | | |
|---|---|---|---|
| 2,360,062 | 10/1944 | Lannen | 426/523 |
| 3,065,078 | 11/1962 | Minami | 426/233 |
| 4,241,288 | 12/1980 | Aoshima et al. | 219/433 |
| 4,313,051 | 1/1982 | Aoshima | 219/433 |
| 4,315,138 | 2/1982 | Miwa | 219/433 |
| 4,315,139 | 2/1982 | Onishi et al. | 219/433 |
| 4,421,974 | 12/1983 | Oota et al. | 219/433 |
| 4,438,324 | 3/1984 | Narita et al. | 219/433 |
| 4,442,130 | 4/1984 | Autrey et al. | 426/508 |
| 4,463,249 | 7/1984 | Narita et al. | 219/433 |
| 4,670,282 | 6/1987 | Onishi et al. | 426/508 |
| 4,869,164 | 9/1989 | Takeyama | 99/333 |
| 4,996,410 | 2/1991 | Ho | 219/433 |
| 5,520,094 | 5/1996 | Lu | 99/331 |
| 5,539,184 | 7/1996 | Su | 219/389 |
| 5,567,458 | 10/1996 | Wu | 426/233 |
| 5,595,105 | 1/1997 | Kang | 219/441 |
| 5,605,090 | 2/1997 | Mantani et al. | 99/331 |
| 5,615,605 | 4/1997 | Kakimoto et al. | 99/331 |

FOREIGN PATENT DOCUMENTS

| | | | |
|---|---|---|---|
| 62-55414 | 11/1987 | Japan . | |
| 5-115356 | 5/1993 | Japan | 219/441 |

Primary Examiner—Donald E. Czaja
Assistant Examiner—Michael P. Colaianni
Attorney, Agent, or Firm—Burns, Doane, Swecker & Mathis, L.L.P.

[57] ABSTRACT

A rice cooker is placed on a turntable, and uncooked rice is poured thereinto. As the uncooked rice is poured-in, a motor rotates the turntable alternately clockwise and counterclockwise to cause the rice to be evenly distributed therein. The cooker carries a signal emitter which is received by a receiver that is connected to the motor for controlling the motor.

9 Claims, 13 Drawing Sheets

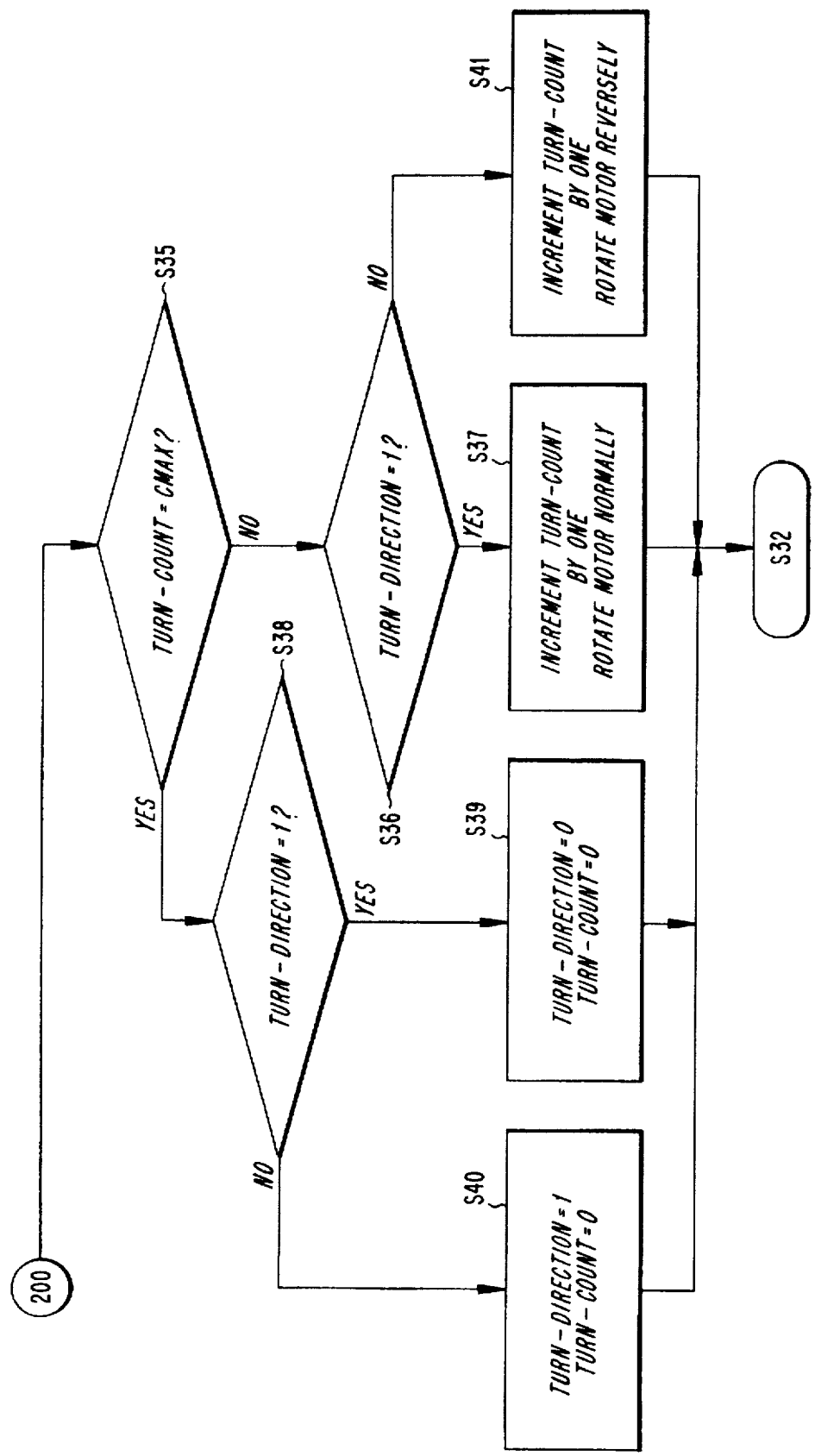

1

METHOD FOR CONTROLLING A RICE COOKER TO EVENLY DISTRIBUTE RICE THEREIN

BACKGROUND OF THE INVENTION

1. Field of the Invention

The present invention relates in general to a rice cooking apparatus and a method of controlling the same.

2. Description of the Prior Art

One example of a conventional rice cooking apparatus is disclosed in Japanese Patent Publication Sho. 62-55414, which is shown in FIG. 11, herein. As shown in FIG. 11, the conventional rice cooking apparatus comprises a rice amount measuring chamber 202 for measuring an amount of rice, a water supply tank 204, a rice washing chamber 206 for washing the rice, and a rice cooker 208 for boiling the washed rice.

However, in the above-mentioned conventional rice cooking apparatus, when the washed rice from the rice washing chamber 206 is supplied to the rice cooker 208, it must manually be spread evenly in the rice cooker 208 by the user which constitutes an inconvenience.

SUMMARY OF THE INVENTION

Therefore, the present invention has been made in view of the above problem, and it is an object of the present invention to provide a rice cooking apparatus which is convenient and simple in use and a method of controlling the same.

In accordance with an aspect of the present invention, there is provided a rice cooking apparatus comprising first control means installed in a housing; second control means installed in a rice cooker to communicate with the first control means; first interface means for transferring a position signal from the first control means to the second control means; second interface means for transferring a response signal from the second control means to the first control means; a motor being rotated in response to a rotation signal from the first control means to place the rice cooker in its normal position and spread rice evenly in the rice cooker; and rotation-number detection means for detecting the number of rotations of the motor to allow the first control means to recognize it.

In accordance with another aspect of the present invention, there is provided a method of controlling a rice cooking apparatus, comprising the step of placing a rice cooker in its normal position when it is laid on a turntable; the step of pouring washed rice from a rice washing chamber into the rice cooker; and the step of spreading the poured rice evenly in the rice cooker.

BRIEF DESCRIPTION OF THE DRAWINGS

The above and other objects, features and advantages of the present invention will be more clearly understood from the following detailed description taken in conjunction with the accompanying drawings, in which:

FIGS. 8A and 8B are flowcharts illustrating the step of spreading rice evenly in the rice cooker, which is included in the method of controlling the rice cooking apparatus in accordance with the embodiment of the present invention;

DETAILED DESCRIPTION OF THE PREFERRED EMBODIMENTS

Figure 1:
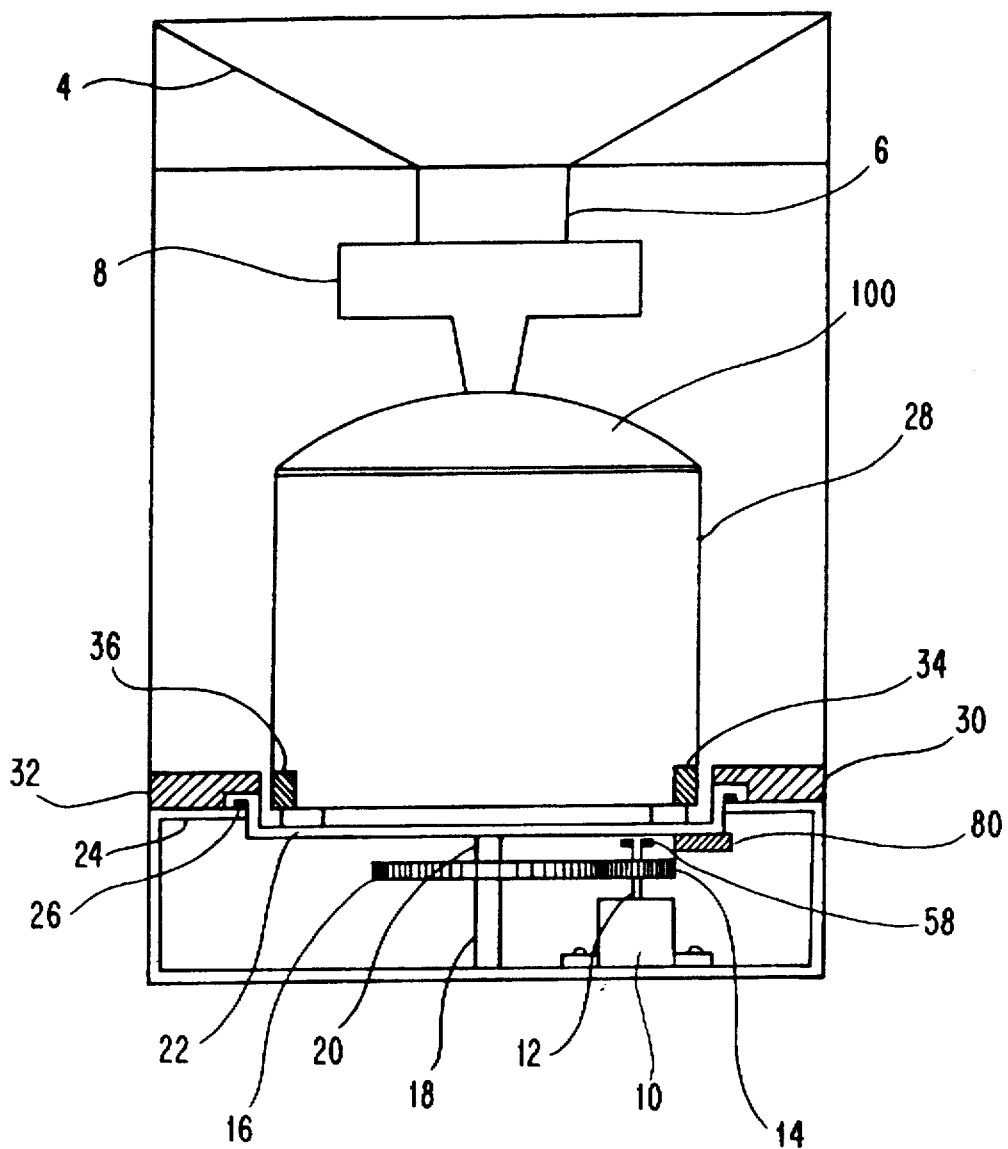
FIG. 1 is a sectional view of a rice cooking apparatus in accordance with an embodiment of the present invention.

Referring to FIG. 1, there is shown a sectional view of a rice cooking apparatus in accordance with an embodiment of the present invention. As shown in this drawing, a rice storage chamber 4 is defined at the upper portion of a housing 24 to store rice therein. Beneath the rice storage chamber 4, measuring means 6 is disposed which serves to measure an amount of rice. A rice washing chamber 8 is also defined in the housing 24 beneath the measuring means 6.

Mounted on the bottom of the housing 24 is a motor 10 which has a rotating shaft 12 provided with a first gear 14. A second gear 16 is engaged with the first gear 14. The second gear 16 is firmly vertically supported by a vertically extending support shaft 18 fixed to the bottom of the housing 24. Disposed above the second gear 16 is a turntable 22 which is operatively connected to the second gear 16 via a second rotating shaft 20. Along the peripheral edge of the underside of the turntable 22, bearings 26 support the turntable 22 to rotate with respect to the housing 24. On the turntable 22, a rice cooker 28 is laid which contains rice therein.

In the housing 24, a first light emitting circuit 30 and a first light receiving circuit 32 are disposed such that they face each other. The first light emitting circuit 30 serves to transmit a position signal to the rice cooker 28 whereas the first light receiving circuit 32 serves to receive a response signal transmitted from the rice cooker 28.

The rice cooker 28 is provided at its lower portion with a second light receiving circuit 34 and a second light emitting circuit 36 both disposed at the peripheral edge of the rice cooker 28. The second light receiving circuit 34 serves to receive the position signal transmitted from the first light emitting circuit 30 whereas the second light emitting circuit 36 serves to transmit the response signal to the first light receiving unit 32.

Figure 2:
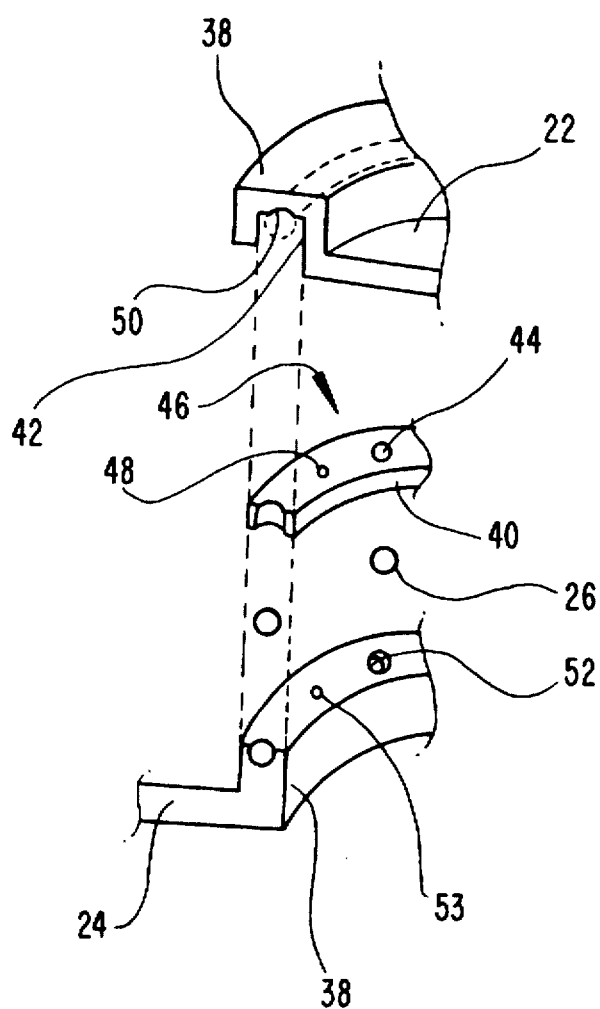
FIG. 2 is an exploded perspective view of a turntable supporting construction of the rice cooking apparatus of FIG. 1.

As shown in FIG. 2, the housing 24 is provided with an annular coupling member 38 having a 90°-inverted L-shaped cross-section. The coupling member 38 is received at its upper portion in an inverted U-shaped coupling groove 42 provided at the peripheral edge of the turntable 22 such that a bearing support member 40 is interposed between the upper surface of the coupling member 38 and the upper surface of the coupling groove 42. The bearing support member 40 has a plurality of spaced bearing support holes 44 adapted to keep the bearings 26 separated. The bearing support member 40 also has fixing holes 48 adapted to couple the bearing support member 40 to the coupling member 38 by means of screws 46, respectively. The coupling groove 42 of turntable 22 has a guide groove 50 receiving the of bearings 26. On the other hand, the coupling member 38 is provided with support grooves 52 each supporting each corresponding bearing 26 to allow an easy rotation of the bearing. The coupling member 38 also has female sleeves 53 which are thread-coupled with the screws 46, respectively.

Figure 3:
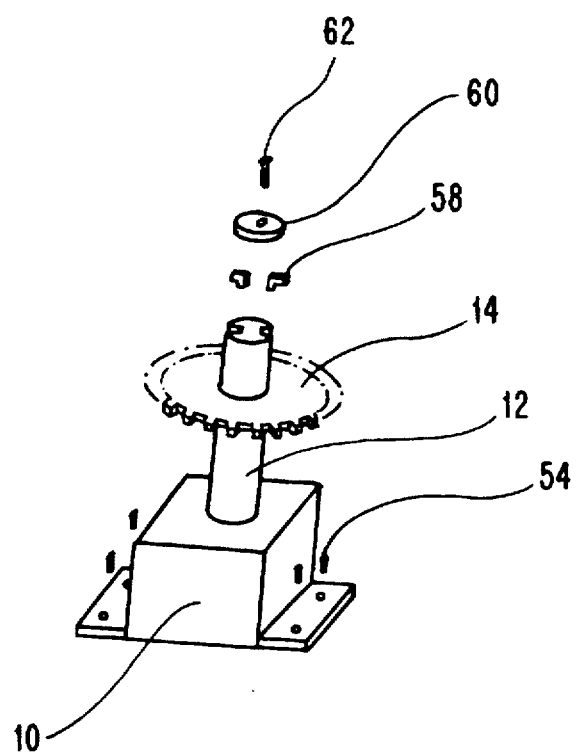
FIG. 3 is an exploded perspective view of a motor and a hall sensor in the rice cooking apparatus of FIG. 1.

As shown in FIG. 3, the motor 10 is fixedly mounted to the housing 24 by means of set screws 54. Magnet pieces 58 are coupled to the rotating shaft 12 of the motor 10. To the rotating shaft 12, a fixing member 60 is also coupled by means of a set screw 62 to retain the magnet pieces 58.

Figure 5:
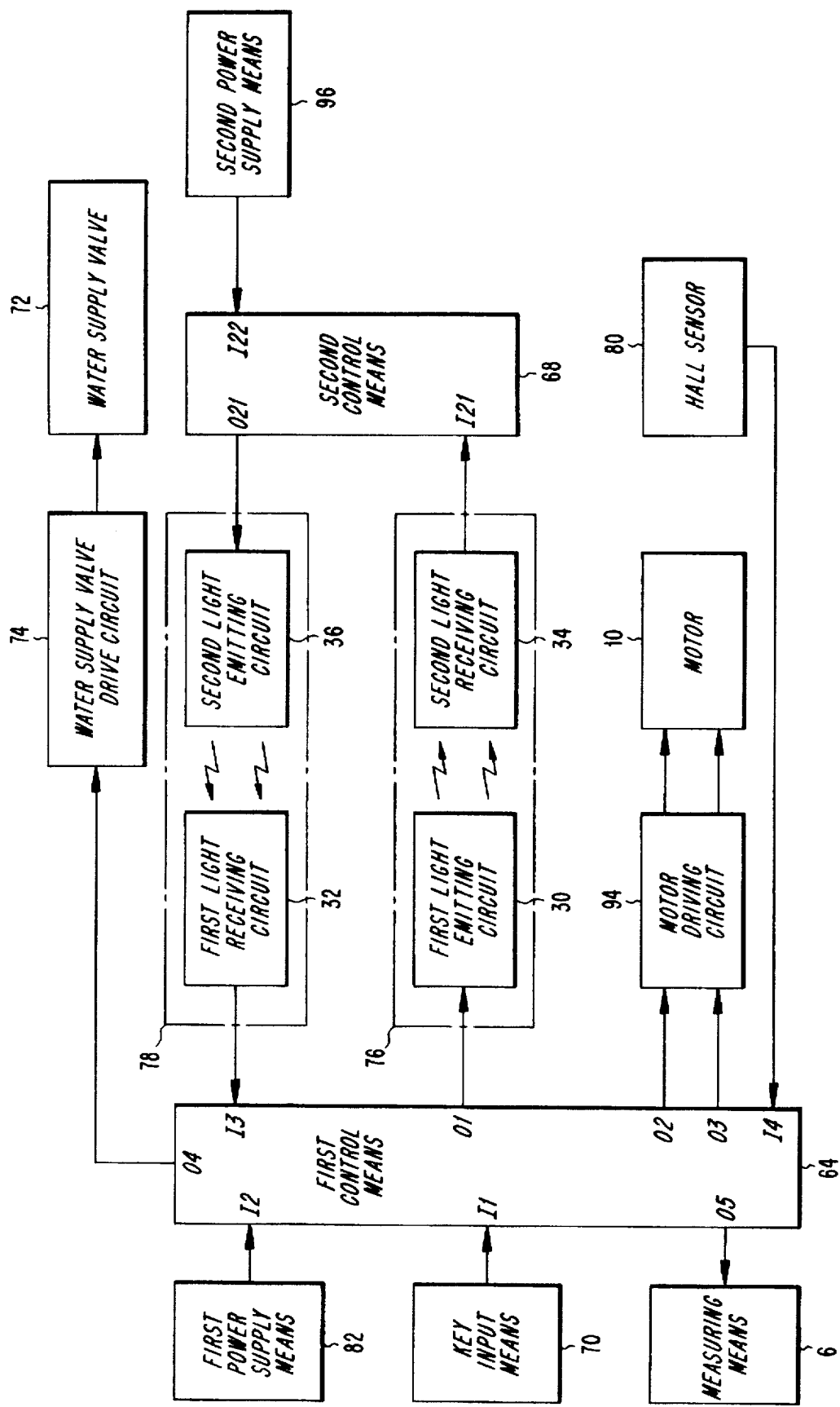
FIG. 5 is a block diagram of a control circuit of the rice cooking apparatus in accordance with the present invention.

Referring to FIG. 5, there is shown a block diagram of a control circuit of the rice cooking apparatus in accordance with an embodiment of the present invention. As shown in this drawing, first control means 64 is installed in the housing 24 to control the entire rice cooking operation. Preferably, the first control means 64 may be a microcomputer.

Second control means 68 is installed in the rice cooker 28 to communicate with the first control means 64. Preferably, the second control means 68 may be a microcomputer.

Key input means 70 is connected to an input port I1 of the first control means 64. The key input means 70 inputs the user's operating commands regarding cooking the rice, such as, for example, the number of persons who will eat, time of day for cooking the rice and etc.

The measuring means 6 is connected to an output port O5 of the first control means 64 to receive therefrom a value corresponding to the number of persons who will eat. The measuring means 6 measures an amount of rice corresponding to the value from the first control means 64 and transports the measured amount of rice from the rice storage chamber 4 to the rice washing chamber 8.

A water supply valve 72 is connected to an output port O4 of the first control means 64 via a water supply valve drive circuit 74. The water supply valve 72 supplies water to the rice washing chamber 8 to allow the rice washing chamber 8 to wash the rice.

First interface means 76 is connected between an output port O1 of the first control means 64 and an input port I21 of the second control means 68 to transfer the position signal from the first control means 64 to the second control means 68. To this end, the first interface means 76 includes the first light emitting circuit 30 and the second light receiving circuit 34.

Second interface means 78 is connected between an output port O21 of the second control means 68 and an input port I3 of the first control means 64 to transfer the response signal from the second control means 68 to the first control means 64. To this end, the second interface means 78 includes the second light emitting circuit 36 and the first light receiving circuit 32.

A Hall sensor 80 is connected to an input port I4 of the first control means 64. The Hall sensor 80 receives a magnetic force from the magnet pieces 58 mounted on the rotating shaft 12 of the motor 10 to detect the number of rotations of the motor 10. The magnet pieces 58 and the Hall sensor 80 constitute rotation-number detection means for detecting the number of rotations of the motor 10 to allow the first control means 64 to recognize it.

Figure 6:
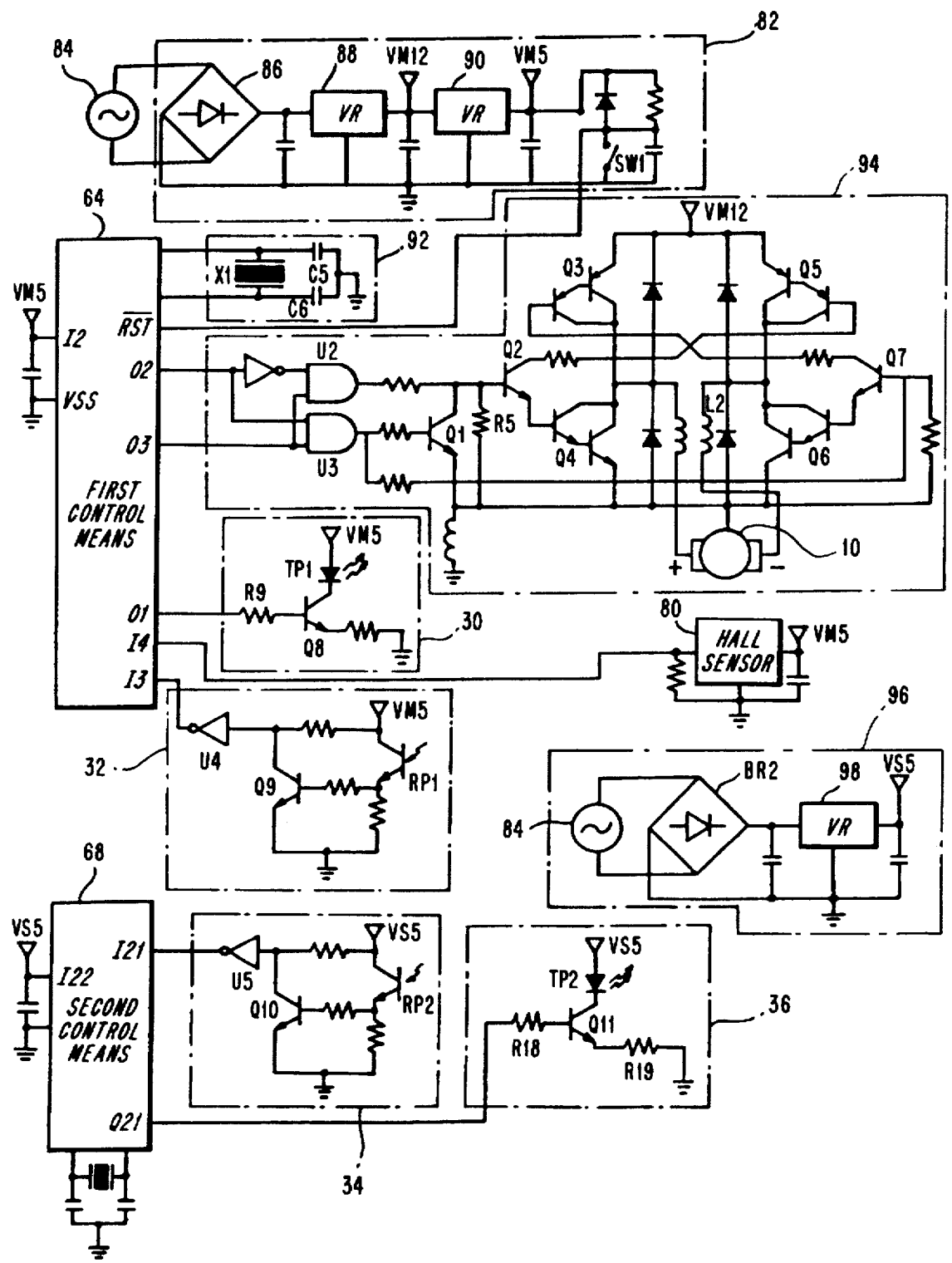
FIG. 6 is a circuit diagram of the control circuit of the rice cooking apparatus in accordance with the present invention.

Referring to FIG. 6, there is shown a circuit diagram of the control circuit of the rice cooking apparatus in accordance with the embodiment of the present invention. First power supply means 82 is adapted to supply a direct current (referred to hereinafter as DC) voltage of 5 V to the first control means 64 and a drive voltage to the motor 10. To this end, the first power supply means 82 includes a bridge diode 86 for converting an alternating current (referred to hereinafter as AC) voltage of 20 V from an external AC power source 84 into a DC voltage of 20 V, a first voltage regulator 88 for converting the DC voltage of 20 V from the bridge diode 86 into a DC voltage of 12 V, a second voltage regulator 90 for converting the DC voltage of 12 V from the first voltage regulator 88 into the DC voltage of 5 V, and a reset switch SW1 for returning the first control means 64 to the initial state.

A clock circuit 92 is adapted to output a clock signal to the first control means 64. To this end, the clock circuit 92 includes a crystal oscillator X1 and capacitors C5 and C6.

A motor drive circuit 94 includes AND gates U2 and U3 for receiving a clock signal from an output port O3 of the first control means 64 and a rotation-direction signal from an output port O2 of the first control means 64, and a transistor Q7 and Darlington circuits Q3 and Q6 being turned on when output signals from the AND gates U2 and U3 are normal direction signals. As being turned on, the transistor Q7 and the Darlington circuits Q3 and Q6 apply a voltage to the motor 10 in the normal direction. The motor drive circuit 94 further includes a transistor Q2 and Darlington circuits Q5 and Q4 being turned on when the output signals from the AND gates U2 and U3 are reverse direction signals. As being turned on, the transistor Q2 and the Darlington circuits Q5 and Q4 apply a voltage to the motor 10 in the reverse direction.

The first light emitting circuit 30 includes a transistor Q8 being turned on/off in response to the position signal from the first control means 64, and a light emitting diode TP1 being turned on/off in response to the on/off states of the transistor Q8.

The first light receiving circuit 32 includes a light receiving transistor RP1 and a transistor Q9 being sequentially turned on in response to the response signal from the second light emitting circuit 36, and an inverter U4 for outputting a high level voltage to the input port I3 of the first control means 64 when the light receiving transistor RP1 and the transistor Q9 are turned on.

The second light emitting circuit 36 includes a transistor Q11 being turned on/off in response to the response signal from the second control means 68, and a light emitting diode TP2 being turned on/off in response to the on/off states of the transistor Q11.

The second light receiving circuit 34 includes a light receiving transistor RP2 and a transistor Q10 being sequentially turned on in response to the position signal from the first light emitting circuit 30, and an inverter U5 for outputting a high level voltage to the input port I21 of the second control means 68 when the light receiving transistor RP2 and the transistor Q10 are turned on.

Second power supply means 96 is adapted to supply a DC voltage of 5 V to the second control means 68. To this end, the second power supply means 96 includes a bridge diode BR2 for converting the AC voltage of 20 V from the external AC power source 84 into a DC voltage of 20 V, and a third voltage regulator 98 for converting the DC voltage of 20 V from the bridge diode BR2 into the DC voltage of 5 V.

Now, a method of controlling the rice cooking apparatus with the above-mentioned construction in accordance with the embodiment of the present invention will be described with reference to FIGS. 7A to 10.

Figure 7A:
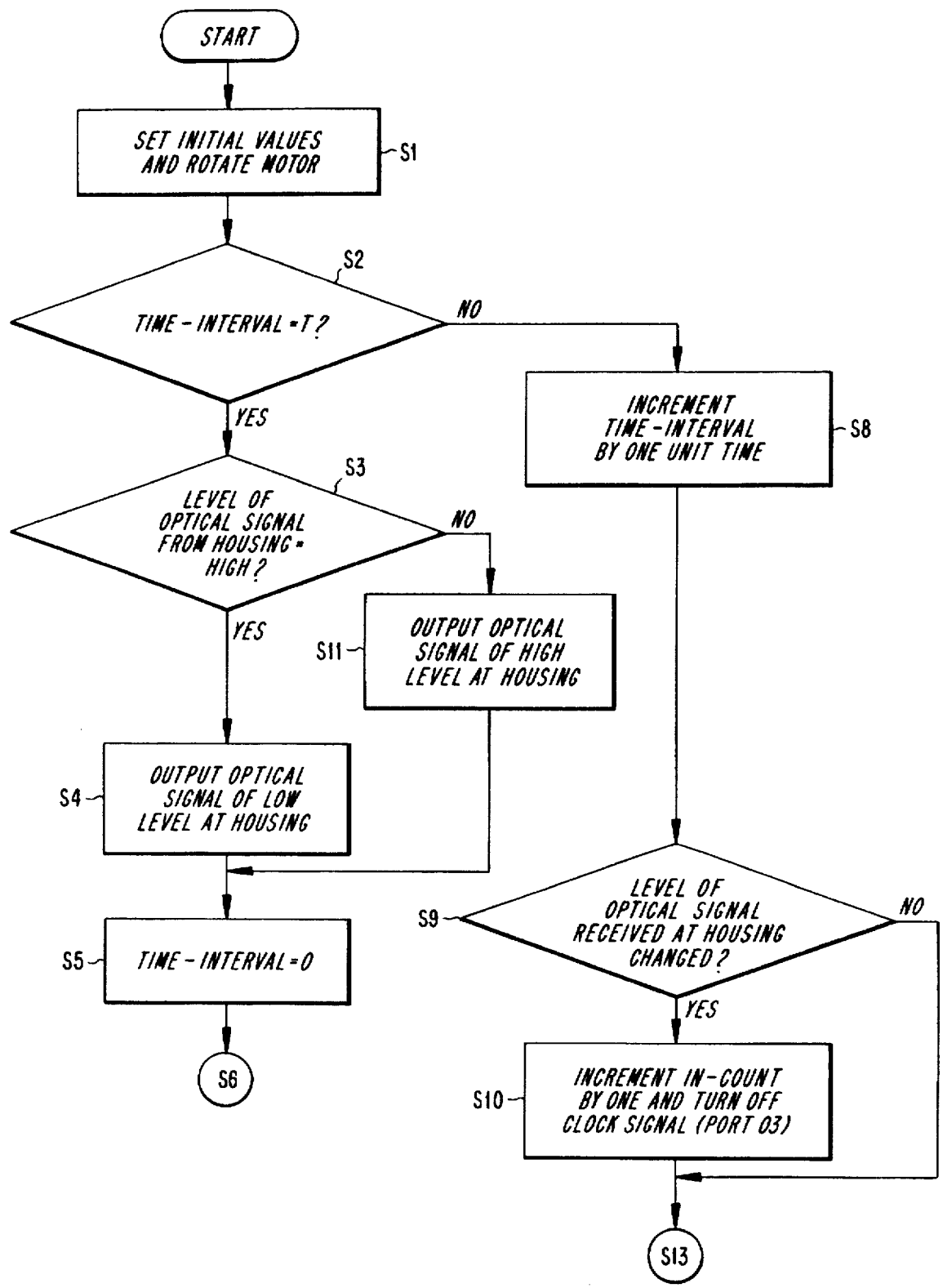
FIGS. 7A and 7B are flowcharts illustrating the procedure for placing the rice cooker in its normal position, which is included in a method of controlling the rice cooking apparatus in accordance with the embodiment of the present invention.
Figure 7B:
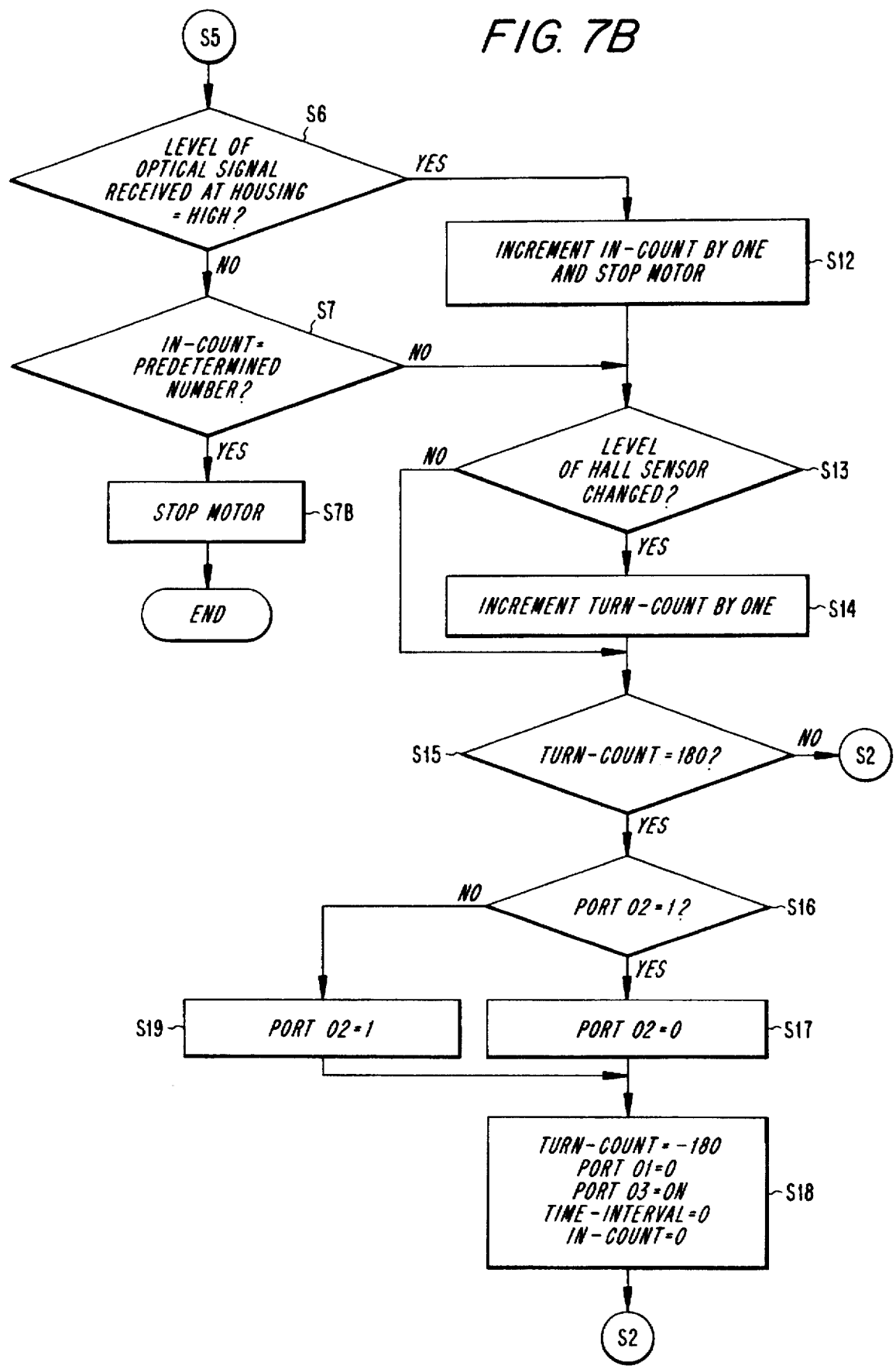
Figure 8A:
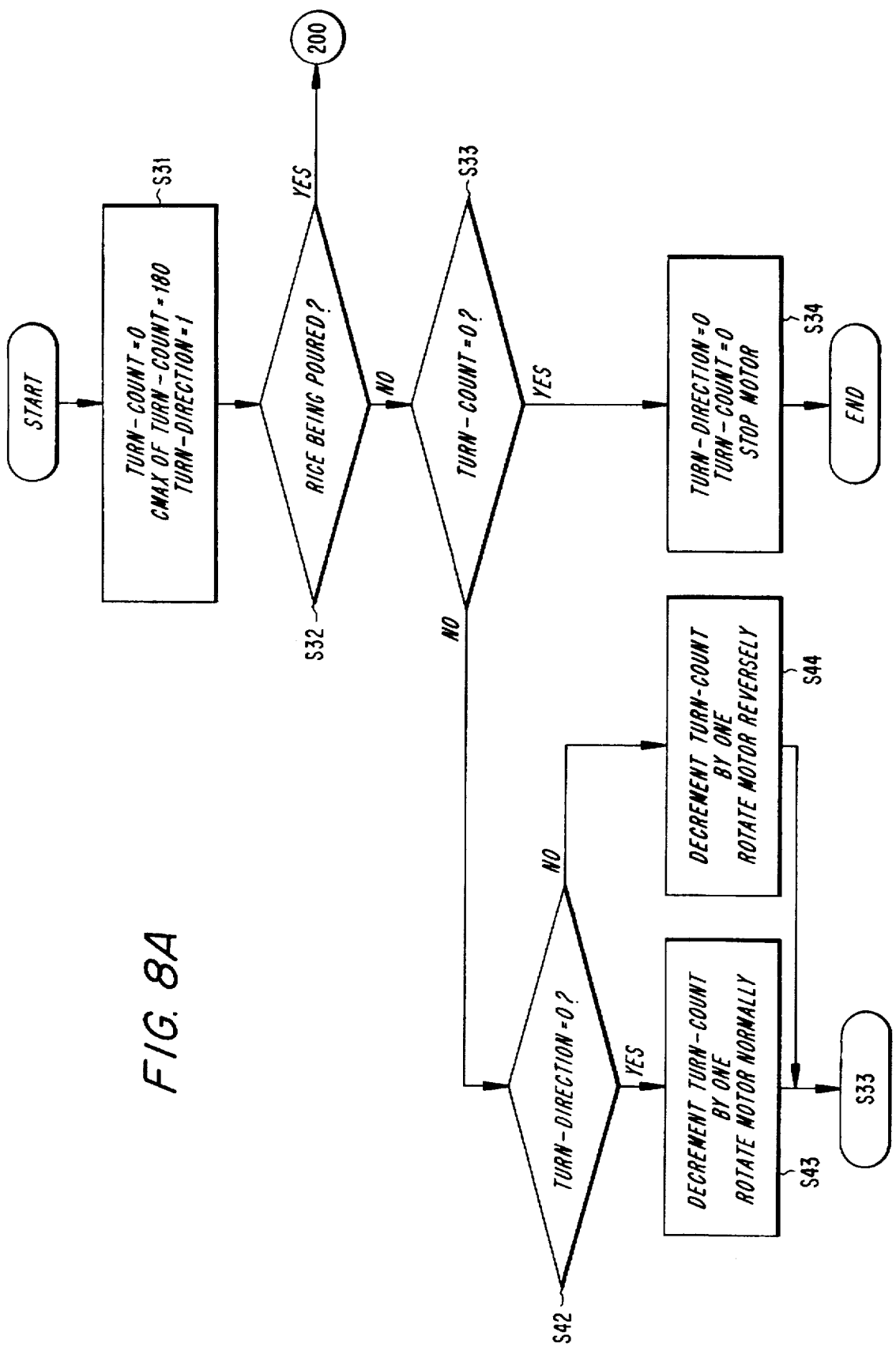

In FIGS. 7A, 7B, 8A, 8B and 10, the reference character S designates step. FIGS. 7A and 7B show the steps for placing the cooker in its normal position, and FIGS. 8A and 8B show the steps for causing rice to be evenly distributed in the cooker.

First, it is, as a prerequisite for cooking, assumed that no rice is stored in the rice storage chamber 4 and that the rice cooker 28 is not laid on the turntable 22. It is also assumed that the AC power source 84 is connected to the first power supply means 82 of the housing 24. As a result, the first power supply means 82 supplies the DC voltage of 12 V to the motor drive circuit 94 through its output terminal VM12. The first power supply means 82 also supplies the DC voltage of 5 V to an input port I2 of the first control means 64 through its output terminal VM5.

Thereafter, at step S1, if the user puts the rice cooker 28 on the turntable 22 and inserts a plug (not shown) connected to the rice cooker 28 into a receptacle, the AC power source 84 supplies the AC voltage of 20 V to the second power supply means 96. In the second power supply means 96, the bridge diode BR2 receives the AC voltage of 20 V from the AC power source 84 and outputs the DC voltage of 20 V to the third voltage regulator 98 which then feeds the DC voltage of 5 V to an input port I22 of the second control means 68.

Then, when the reset switch SW1 of the first power supply means 82 is turned on by the user, it applies an initialization command to a reset terminal/RST of the first control means 64. In response to the initialization command from the reset switch SW1, the first control means 64 sets the initial value of a parameter Turn-Count to 0, which indicates the number of rotations of the motor 10. The first control means 64 also sets the initial value of a parameter In-Count to 0, which indicates the number of optical signals applied to the input port I3 of the first control means 64. The first control means 64 also sets the initial value of a parameter Time-Interval to 0, which indicates a high level duration of an optical signal from the output port O1 of the first control means 64.

Figure 9A:
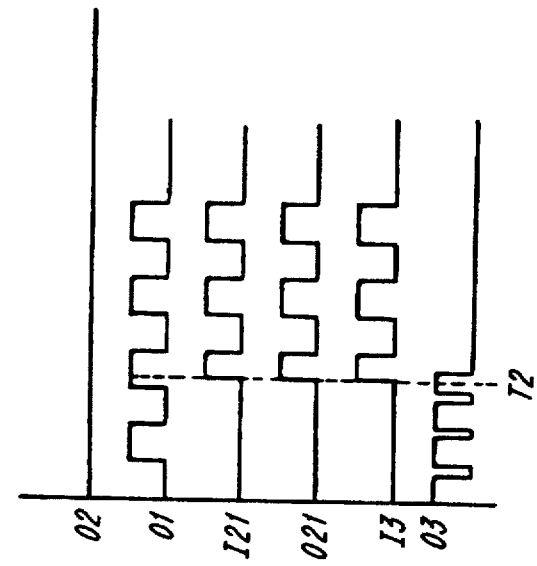
FIG. 9A is a waveform diagram of signals from components in FIG. 6 when the rice cooker is rotated normally.

Further, the first control means 64 outputs a high level signal as shown in FIG. 9A to the motor drive circuit 94 through its output port O2 to rotate the motor 10 in the normal (i.e., clockwise) direction. The first control means 64 also outputs a clock pulse signal as shown in FIG. 9A to the motor drive circuit 94 through its output port O3 to rotate the motor 10. The first control means 64 also outputs an optical signal as shown in FIG. 9A to the first light emitting circuit 30 through its output port O1. As shown in FIG. 9A, the optical signal from the first control means 64 is provided with pulses beginning with low level, each of which has a predetermined width T.

Figure 4:
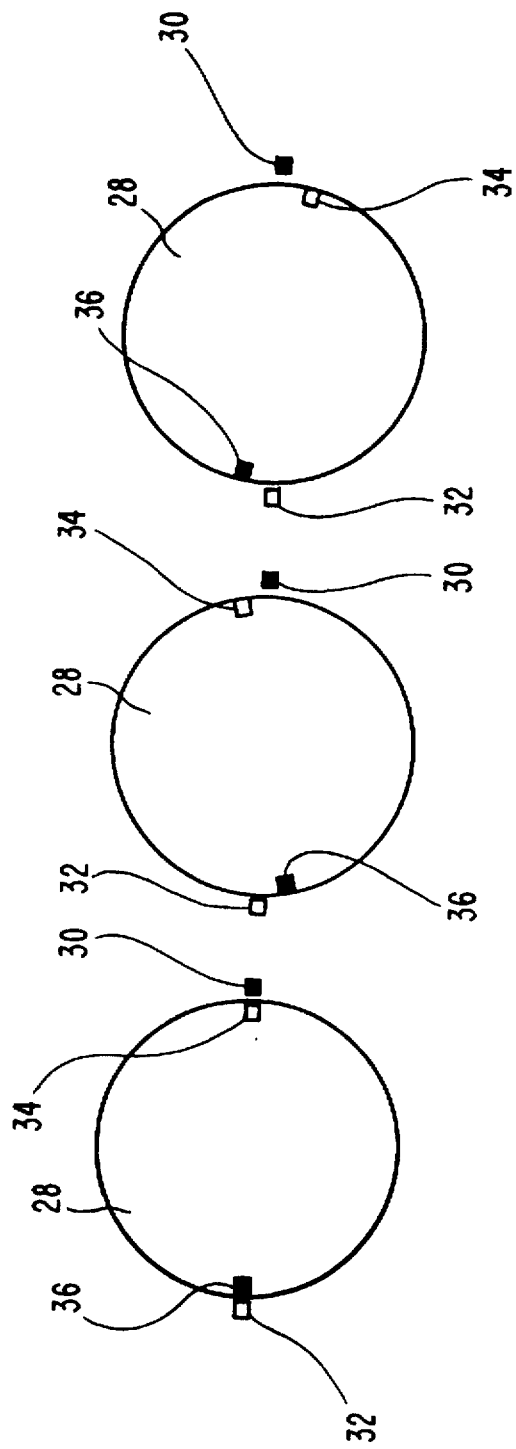
FIG. 4A is a schematic plan view of a rice cooker in the rice cooking apparatus of FIG. 1 when the rice cooker is in its normal position.
FIG. 4B is a plan view of the rice cooker in the rice cooking apparatus of FIG. 1 when it is rotated counterclockwise or reversely.
FIG. 4C is a plan view of the rice cooker in the rice cooking apparatus of FIG. 1 when it is rotated counterclockwise normally.

In the motor drive circuit 94, the AND gate U2 outputs a low level signal and the AND gate U3 outputs the clock signal. The transistor Q1 is turned on in response to the clock signal from the AND gate U3, thereby causing the transistor Q2 to be turned off. Also, the transistor Q7 and the Darlington circuits Q3 and Q6 are sequentially turned on. As a result, current from the output terminal VM12 of the first power supply means 82 flows to a ground terminal through the Darlington circuit Q3, a reactor L1, a plus (+) terminal of the motor 10, a minus (–) terminal of the motor 10, a reactor L2 and the Darlington circuit Q6, resulting in the motor 10 being rotated normally or clockwise. Therefore, due to the arrangement of the gearing 14, 16 the turntable 22 is rotated counterclockwise, thereby causing the rice cooker 28 to be rotated counterclockwise as shown in FIG. 4B.

The first control means 64 discriminates at step S2 whether the flag Time-Interval indicative of the high level duration of the optical signal from the output port O1 thereof is equal to the predetermined time interval T. If YES at step S2, i.e., if it is discriminated that the parameter Time-Interval is equal to the predetermined time interval T, for example, 500 μSEC, the first control means 64 proceeds to step S3.

The first control means 64 discriminates at step S3 whether the optical signal from the output port O1 thereof is high in level. If YES at step S3, i.e., if it is discriminated that the optical signal from the output port O1 is high in level, the first control means 64 proceeds to step S4.

At step S4, the first control means 64 outputs the optical signal of low level to the first light emitting circuit 30 through its output port O1.

At step S5, the first control means 64 sets the initial value of the parameter Time-Interval to 0.

The first control means 64 discriminates at step S6 whether the optical signal received at the input port I3 thereof is high in level. If NO at step S6 or if it is discriminated that the optical signal received at the input port I3 is not high in level, the first control means 64 proceeds to step S7.

The first control means 64 discriminates at step S7 whether the parameter In-Count indicative of the number of optical signals received at the input port I3 thereof is equal to a predetermined number, for example, 3. If YES at step S7, i.e., if it is discriminated that the parameter In-Count is equal to the predetermined number, the first control means 64 recognizes that the rice cooker 28 has been placed in its normal position as shown in FIG. 4A and then proceeds to step S7B.

At step S7B, the first control means 64 outputs a low level signal to the motor drive circuit 94 through its output port O3. In the motor drive circuit 94, the transistors Q1, Q2 and Q7 are all turned off in response to the low level signal from the first control means 64, thereby causing no voltage to be applied to the motor 10. As a result, the motor 10 is stopped, and the turntable 22 and the rice cooker 28 are thus stopped.

On the other hand, if NO at step S2 or if it is discriminated that the parameter Time-Interval indicative of the high level duration of the optical signal from the output port O1 is not equal to the predetermined time interval T, the first control means 64 proceeds to step S8.

At step S8, the first control means 64 increments the parameter Time-Interval by one unit time, for example, 100 μSEC.

The first control means 64 discriminates at step S9 whether the optical signal received at the input port I3 thereof has been changed in level. If YES at step S9, i.e., if it is discriminated that the optical signal received at the input port I3 has been changed in level as shown at time T1 in FIG.

Figure 9B:
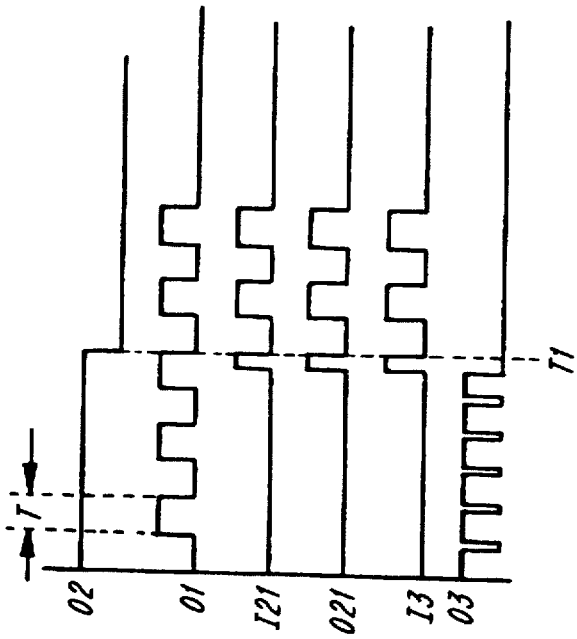
FIG. 9B is a waveform diagram of signals from the components in FIG. 6 when the rice cooker is rotated reversely.

9A or time T2 in FIG. 9B, the first control means 64 proceeds to step S10.

At step S10, the first control means 64 increments the parameter In-Count by one. The first control means 64 also outputs a low level signal to the motor drive circuit 94 through its output port O3 to stop the motor 10. Then, the first control means 64 proceeds to step S13 to prevent the snarl of a power line connected to the rice cooker 28, as will be mentioned later.

On the other hand, if NO at step S9, i.e., if it is discriminated that the optical signal received at the input port I3 has not been changed in level, the first control means 64 proceeds to step S13 to prevent the snarl of the power line connected to the rice cooker 28, as will be mentioned later.

If NO at step S3, i.e., if it is discriminated that the optical signal from the output port O1 is not high in level, the first control means 64 proceeds to step S11 for the production of optical pulse.

At step S11, the first control means 64 outputs a high level signal to the first light emitting circuit 30 through its output port O1. In the first light emitting circuit 30, the high level signal from the first control means 64 is applied to a base of the transistor Q8 via a resistor R9, thereby causing the transistor Q8 to be turned on. As the transistor Q8 is turned on, a voltage is applied to the light emitting diode TP1, so that light can be emitted therefrom. In the second light receiving circuit 34, the light receiving transistor RP2 is turned on by the light emitted from the light emitting diode TP1 in the first light emitting circuit 30. As the light receiving transistor RP2 is turned on, the transistor Q10 is turned on to apply a low level voltage to the inverter U5. As a result, the inverter U5 outputs a high level voltage to the input port I21 of the second control means 68. Then, the first control means 64 proceeds to step S5 to set the initial value of the parameter Time-Interval to 0.

If YES at step S6, i.e., if it is discriminated that the optical signal received at the input port I3 is high in level, the first control means 64 proceeds to step S12.

At step S12, the first control means 64 increments the parameter In-Count by one. The first control means 64 also outputs a low level signal to the motor drive circuit 94 through its output port O3 to stop the motor 10.

The first control means 64 discriminates at step S13 whether a rotation-number signal from the Hall sensor 80 received at the input port I4 thereof has been changed in level. If YES at step S13 or if it is discriminated that the rotation-number signal from the Hall sensor 80 received at the input port I4 has been changed in level, the first control means 64 proceeds to step S14.

At step S14, the first control means 64 increments the parameter Turn-Count indicative of the rotation-number of the motor 10 by one.

The first control means 64 discriminates at step S15 whether the parameter Turn-Count indicative of the rotation-number of the motor 10 is equal to a predetermined value, for example, 180. If YES at step S15, i.e., if it is discriminated that the parameter Turn-Count is equal to the predetermined value, the first control means 64 recognizes that the power line connected to the rice cooker 28 is liable to snarl due to the excessive rotations of the rice cooker 28 and then proceeds to step S16 to rotate the rice cooker 28 in the opposite direction to the present direction.

At step S16, the first control means 64 discriminates whether the rotation-direction signal from the output port O2 thereof is a normal direction signal or a high level signal. If YES at step S16, i.e., if it is discriminated that the rotation-direction signal from the output port O2 is the normal direction signal or the high level signal, the first control means 64 proceeds to step S17 to rotate the motor 10 in the reverse direction.

At step S17, the first control means 64 outputs a low level signal to the motor drive circuit 94 through its output port O2. In the motor drive circuit 94, an inverter U1 inverts the low level signal from the first control means 64 and outputs the resultant high level signal to the AND gate U2.

At step S18, the first control means 64 sets the initial value of the flag Turn-Count indicative of the rotation-number of the motor 10 to a second predetermined value, for example, −180. The first control means 64 also sets the initial value of the flag Time-Interval to 0. The first control means 64 further sets the initial value of the flag In-Count to 0.

Further, the first control means 64 outputs a low level signal as shown in FIG. 9B to the light emitting circuit 30 through its output port O1.

At the same time, the first control means 64 outputs a clock signal as shown in FIG. 9B to the motor drive circuit 94 through its output port O3. In the motor drive circuit 94, the AND gate U3 outputs the clock signal to a base of the transistor Q1 and the AND gate U2 outputs a low level signal to a base of the transistor Q2. Next, the transistor Q7 is turned off, and the transistor Q2 and the Darlington circuits Q4 and Q5 are turned on. As a result, current from the output terminal VM12 of the first power supply means 82 flows to the ground terminal through the Darlington circuit Q5, the reactor L2, the minus (−) terminal of the motor 10, the plus (+) terminal of the motor 10, the reactor Li and the Darlington circuit Q4, resulting in the motor 10 being rotated reversely or counterclockwise. Therefore, the turntable 22 is rotated clockwise, thereby causing the rice cooker 28 to be rotated clockwise as shown in FIG. 4C.

The first control means 64 then proceeds to step S2 to allow the first light emitting circuit 30 to output the optical signal in pulse form to the second light receiving circuit 34, as mentioned above.

On the other hand, if NO at step S13, i.e., if it is discriminated that the rotation-number signal from the Hall sensor 80 received at the input port I4 has not been changed in level, the first control means 64 proceeds to step S15 to discriminate whether the motor 10 and the rice cooker 28 are excessively rotating.

If NO at step S15, i.e., if it is discriminated that the flag Turn-Count indicative of the rotation-number of the motor 10 is not equal to the predetermined value, the first control means 64 recognizes that the motor 10 and the rice cooker 28 are not rotating excessively and then proceeds to step S2 to continue to rotate the motor 10 and to allow the first light emitting circuit 30 to output the optical signal in pulse form to the second light receiving circuit 34, as mentioned above.

If NO at step S16, i.e., if it is discriminated that the rotation-direction signal from the output port O2 is not the normal direction signal, the first control means 64 proceeds to step S19 to change the rotating direction of the motor 10. Namely, the motor 10 is presently rotating in the reverse direction or counterclockwise by the motor drive circuit 94 operating in response to a reverse direction signal or a low level signal from the output port O2 of the first control means 64. At step S19, the first control means 64 outputs the normal direction signal or the high level signal to the motor drive circuit 94 through its output port O2 to rotate the motor 10 in the normal direction. In the motor drive circuit 94, the inverter U1 inverts the high level signal from the first control means 64 and outputs the resultant low level signal to the AND gate U2. The first control means 64 then proceeds to step S18.

At step S18, as mentioned previously, the first control means 64 sets the initial value of the parameter Turn-Count indicative of the number of rotations of the motor 10 to the second predetermined value. The first control means 64 also sets the initial value of the parameter Time-Interval indicative of the high level duration of the optical signal from the output port O1 thereof to 0. The first control means 64 further sets the initial value of the parameter In-Count indicative of the number of optical signals received at the input port I3 thereof to 0. At the same time, the first control means 64 outputs a low level signal as shown in FIG. 9B to the light emitting circuit 30 through its output port O1.

On the other hand, if NO at step S7, i.e., if it is discriminated that the parameter In-Count indicative of the number of optical signals received at the input port I3 is not equal to the predetermined number, the first control means 64 recognizes that the rice cooker 28 is not placed yet in its normal position and then proceeds to step S13 to discriminate whether the motor 10 and the rice cooker 28 are excessively rotating in one direction as mentioned above.

In the case where the rice cooker 28 is placed in its normal position in the housing 24 as mentioned previously, the user applies the number of persons who will eat and the rice cooking reservation time to the key input means 70, which then outputs the corresponding operating commands to the input port I1 of the first control means 64.

When the present time of day reaches the rice cooking time, the first control means 64 outputs a value corresponding to the number of persons who will eat. The measuring means 6 measures an amount of rice corresponding to the value from the first control means 64 and transports the measured amount of rice from the rice storage chamber 4 to the rice washing chamber 8.

The first control means 64 then outputs a water supply signal to the water supply valve drive circuit 74 through its output port O4 for a water supply time corresponding to the above value therefrom. In response to the water supply signal from the first control means 64, the water supply valve drive circuit 74 supplies an AC voltage of 220 V to the water supply valve 72 to open it.

At the same time, the first control means 64 performs the control operation as shown in FIGS. 8A and 8B. Namely, at step S31, the first control means 64 sets the initial value of the parameter Turn-Count indicative of the number of rotations of the motor 10 to 0. The first control means 64 also sets the maximum value CMAX of the parameter Turn-Count to 180. The first control means 64 further sets the initial value of a parameter Turn-Direction indicative of the rotating direction of the motor 10 to 1.

Then, the water supply valve 72 supplies water to the rice washing chamber 8 to allow the rice washing chamber 8 to wash the rice. The rice washing chamber 8 pours the washed rice into the rice cooker 28.

At step S32, the first control means 64 discriminates whether the water supply valve 72 is still open, to further discriminate whether the rice is being poured into the rice cooker 28. If NO at step S32, i.e., if it is discriminated that the rice is not being poured into the rice cooker 28, the first control means 64 recognizes that the rice pouring has been finished and then proceeds to step S33 to place the rice cooker 28 in its normal position.

The first control means 64 discriminates at step S33 whether the parameter Turn-Count indicative of the number of rotations of the motor 10 is 0. If YES at step S33, i.e., if it is discriminated that the parameter Turn-Count is 0, the first control means 64 recognizes that the rice cooker 28 has been placed in its normal position and then proceeds to step S34 to stop the motor 10.

At step S34, the first control means 64 sets the parameter Turn-Direction indicative of the rotating direction of the motor 10 to 0 as the reverse direction signal. The first control means 64 also sets the parameter Turn-Count indicative of the number of rotations of the motor 10 to 0. At the same time, the first control means 64 outputs a low level signal to the motor drive circuit 94 through its output port O3 to stop the motor 10. As the motor 10 is stopped, the turntable 22 and the rice cooker 28 are stopped.

On the other hand, if YES at step S32, i.e., if it is discriminated that the rice is being poured into the rice cooker 28, the first control means 64 proceeds to step S35 to alternately rotate the rice cooker 28 to the left and right, so as to spread the rice evenly in the rice cooker 28.

At step S35, the first control means 64 discriminates whether the parameter Turn-Count indicative of the number of rotations of the motor 10 is the maximum value CMAX. If NO at step S35, i.e., if it is discriminated that the parameter Turn-Count is not the maximum value CMAX, the first control means 64 proceeds to step S36 to continue to rotate the motor 10 in the present direction.

At step S36, the first control means 64 discriminates whether the parameter Turn-Direction indicative of the rotating direction of the motor 10 is 1. If YES at step S36, i.e., if it is discriminated that the parameter Turn-Direction is 1, the first control means 64 proceeds to step S37 to rotate the motor 10 in the normal direction.

At step S37, the first control means 64 increments the parameter Turn-Count indicative of the rotation-number of the motor 10 by one. At the same time, the first control means 64 outputs a high level signal to the motor drive circuit 94 through its output port O2. The first control means 64 also outputs a clock signal to the motor drive circuit 94 through its output port O3. As a result, the motor 10 is rotated normally or clockwise. As the motor 10 is rotated clockwise, the turntable 22 and the rice cooker 28 are rotated counterclockwise. Therefore, the washed rice from the rice washing chamber 8 poured into the rice cooker 28 can be spread evenly in the rice cooker 28. The first control means 64 then proceeds to step S32 to discriminate whether the rice is being poured into the rice cooker 28, as mentioned above.

On the other hand, if NO at step S36, i.e., if it is discriminated that the parameter Turn-Direction indicative of the rotating direction of the motor 10 is not 1, the first control means 64 proceeds to step S41 to rotate the motor 10 in the reverse direction.

At step S41, the first control means 64 increments the parameter Turn-Count indicative of the rotation-number of the motor 10 by one. At the same time, the first control means 64 outputs a low level signal to the motor drive circuit 94 through its output port O2. The first control means 64 also outputs a clock signal to the motor drive circuit 94 through its output port O3. As a result, the motor 10 is rotated reversely or counterclockwise. As the motor 10 is rotated counterclockwise, the turntable 22 and the rice cooker 28 are rotated clockwise. Therefore, the washed rice from the rice washing chamber 8 poured into the rice cooker 28 can be spread evenly in the rice cooker 28. The first control means 64 then proceeds to step S32 to discriminate whether the rice is being poured into the rice cooker 28, as mentioned above.

If YES at step S35, i.e., if it is discriminated that the parameter Turn-Count indicative of the rotation-number of the motor 10 is the maximum value CMAX, the first control means 64 proceeds to step S38 to change the rotating direction of the motor 10.

At step S38, the first control means 64 discriminates whether the parameter Turn-Direction indicative of the rotating direction of the motor 10 is 1. If YES at step S38, i.e., if it is discriminated that the parameter Turn-Direction is 1, the first control means 64 proceeds to step S39 to rotate the motor 10 in the reverse direction.

At step S39, the first control means 64 sets the parameter Turn-Direction indicative of the rotating direction of the motor 10 to 0. The first control means 64 also sets the parameter Turn-Count indicative of the number of rotations of the motor 10 to 0. The first control means 64 then proceeds to step S32 to discriminate whether the rice is being poured into the rice cooker 28, as mentioned above.

On the other hand, if NO at step S38, i.e., if it is discriminated that the parameter Turn-Direction indicative of the rotating direction of the motor 10 is not 1, the first control means 64 proceeds to step S40 to rotate the motor 10 in the normal direction.

At step S40, the first control means 64 sets the parameter Turn-Direction indicative of the rotating direction of the motor 10 to 1. The first control means 64 also sets the parameter Turn-Count indicative of the number of rotations of the motor 10 to 0. The first control means 64 then proceeds to step S32 to discriminate whether the rice is being poured into the rice cooker 28, as mentioned above.

If NO at step S33 or if it is discriminated that the parameter Turn-Count indicative of the number of rotations of the motor 10 is not 0, the first control means 64 proceeds to step S42 to return the rice cooker 28 to a position before the rice was poured therein.

At step S42, the first control means 64 discriminates whether the parameter Turn-Direction indicative of the rotating direction of the motor 10 is 0. If YES at step S42, i.e., if it is discriminated that the parameter Turn-Direction is 0, the first control means 64 proceeds to step S43 to rotate the motor 10 in the normal direction.

At step S43, the first control means 64 decrements the parameter Turn-Count indicative of the rotation-number of the motor 10 by one. At the same time, the first control means 64 outputs a high level signal to the motor drive circuit 94 through its output port O2. The first control means 64 also outputs a clock signal to the motor drive circuit 94 through its output port O3. As a result, the motor 10 is rotated normally or clockwise. As the motor 10 is rotated clockwise, the turntable 22 and the rice cooker 28 are rotated counterclockwise. The first control means 64 then proceeds to step S33 to discriminate whether the rice cooker 28 has been placed in its normal position, as mentioned above.

On the other hand, if NO at step S42, i.e., if it is discriminated that the parameter Turn-Direction indicative of the rotating direction of the motor 10 is not 0, the first control means 64 proceeds to step S44 to rotate the motor 10 in the reverse direction.

At step S44, the first control means 64 decrements the parameter Turn-Count indicative of the rotation-number of the motor 10 by one. At the same time, the first control means 64 outputs a low level signal to the motor drive circuit 94 through its output port O2. The first control means 64 also outputs a clock signal to the motor drive circuit 94 through its output port O3. As a result, the motor 10 is rotated reversely or counterclockwise. As the motor 10 is rotated counterclockwise, the turntable 22 and the rice cooker 28 are rotated clockwise. The first control means 64 then proceeds to step S33 to discriminate whether the rice cooker 28 has been placed in its normal position, as mentioned above.

As stated above, the rice cooker 28 is rapidly rotated alternately to the left and right when it receives the washed rice from the rice washing chamber 8. Therefore, the rice can be spread evenly in the rice cooker 28.

Next, the user puts the lid 100 on the rice cooker 28, and the second control means 68 outputs a heating signal to a heater (not shown) of the rice cooker 28. In response to the heating signal from the second control means 68, the heater generates heat, thereby causing the rice to be boiled. Cooking the rice can be accomplished by sufficiently boiling and then steaming the rice.

The signal transfer operation of the second control means 68 installed in the rice cooker 28 will hereinafter be described in detail with reference to FIG. 10.

Figure 10:
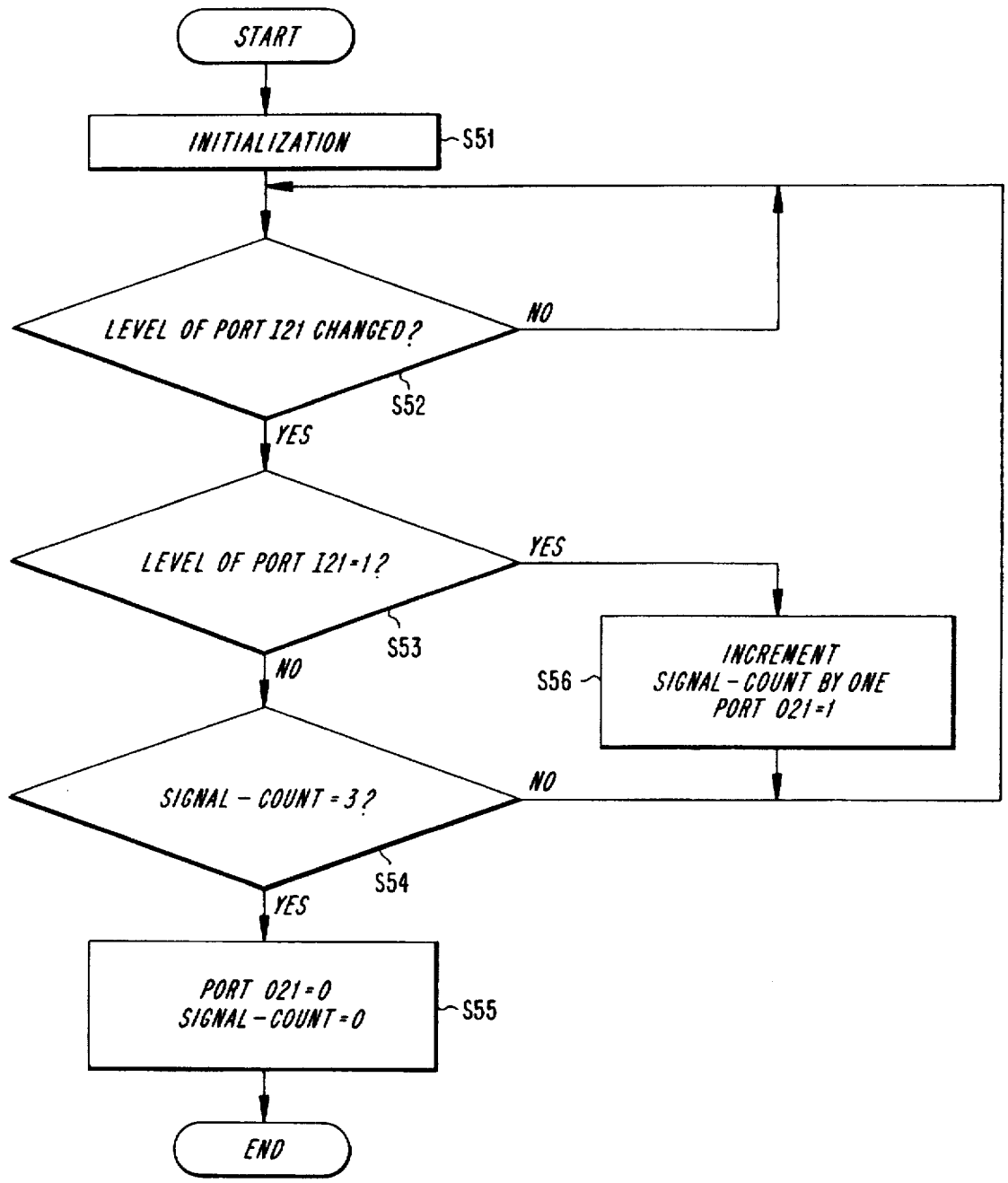
FIG. 10 is a flowchart illustrating the step of transferring signals in the rice cooker, which is included in the method of controlling the rice cooking apparatus in accordance with the embodiment of the present invention.
Figure 11:
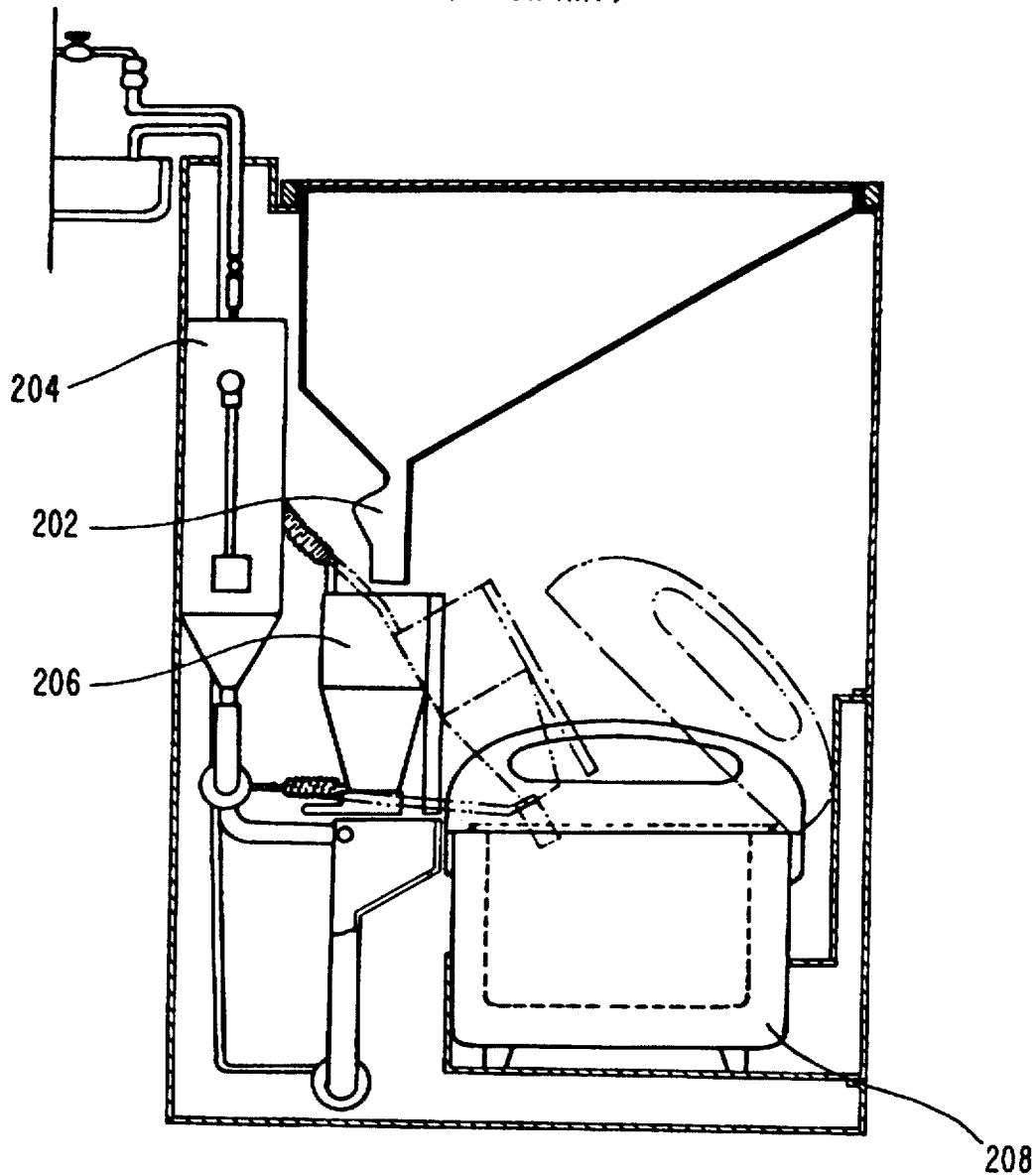
FIG. 11 is a sectional view of a conventional rice cooking apparatus.

FIG. 10 is a flowchart illustrating the step of transferring signals in the rice cooker, which is included in the method of controlling the rice cooking apparatus in accordance with the embodiment of the present invention.

Upon receiving the DC voltage of 5 V from the second power supply means 96 at step S1, the second control means 68 sets the initial value of a parameter Signal-Count to 0 at step S51, which indicates the number of optical signals received at the rice cooker 28. Also at the step S51, the second control means 68 outputs a low level signal to the second light emitting circuit 36 through its output port O21.

The second control means 68 discriminates at step S52 whether the optical signal from the second light receiving circuit 34 received at the input port I21 thereof has been changed in level. If YES at step S52, i.e., if it is discriminated that the optical signal from the second light receiving circuit 34 received at the input port I21 has been changed in level, the second control means 68 proceeds to step S53 to discriminate the changed level of the optical signal.

At step S53, the second control means 68 discriminates whether the optical signal received at the input port I21 thereof is high in level. If NO at step S53, i.e., if it is discriminated that the optical signal received at the input port I21 is not high in level, the second control means 68 proceeds to step S54 to discriminate whether the rice cooker 28 has been placed in its normal position.

At step S54, the second control means 68 discriminates whether the parameter Signal-Count indicative of the number of optical signals received at the input port I21 thereof is equal to a predetermined number, for example, 3. If YES at step S54, i.e., if it is discriminated that the parameter Signal-Count is equal to the predetermined number, the second control means 68 recognizes that the rice cooker 28 has been placed in its normal position in the housing 24 and then proceeds to step S55 to initialize the parameter Signal-Count.

At step S55, the second control means 68 outputs a low level signal to the second light emitting circuit 36 through its output port O21. The second control means 68 also sets the flag Signal-Count indicative of the number of optical signals received at the input port I21 thereof to 0.

On the other hand, if NO at step S52, i.e., if it is discriminated that the optical signal from the second light receiving circuit 34 received at the input port I21 has not been changed in level, the second control means 68 continues to perform step S52 to discriminate whether the optical signal from the second light receiving circuit 34 received at the input port I21 thereof has been changed in level.

If YES at step S53, i.e., if it is discriminated that the optical signal received at the input port I21 is high in level, the second control means 68 proceeds to step S56.

At step S56, the second control means 68 increments the parameter Signal-Count indicative of the number of optical signals received at the input port I21 thereof by one. At the same time, the second control means 68 outputs a high level signal to the second light emitting circuit 36 through its output port O21. In the second light emitting circuit 36, the transistor Q11 is turned on in response to the high level signal from the second control means 68. As the transistor Q11 is turned on, a voltage is applied to the light emitting diode TP2, so that light can be emitted therefrom. The light emitted from the light emitting diode TP2 in the second light emitting circuit 36 is transferred to the light receiving transistor RP1 in the first light receiving circuit 32. Then, the second control means 68 proceeds to step S52 to discriminate whether the optical signal from the second light receiving circuit 34 received at the input port I21 thereof has been changed in level.

On the other hand, if NO at step S54, i.e., if it is discriminated that the parameter Signal-Count indicative of the number of optical signals received at the input port I21 is not equal to the predetermined number, the second control means 68 recognizes that the rice cooker 28 is not placed yet in its normal position and then proceeds to step S52 to discriminate whether the optical signal from the second light receiving circuit 34 received at the input port I21 thereof has been changed in level.

As apparent from the above description, according to the present invention, when the rice cooker is laid on the turntable and powered by the user, it is rotated to be placed in its normal position. When the rice cooker receives the washed rice from the rice washing chamber, it is rapidly rotated alternately to the left and right to spread the rice evenly therein. Therefore, the present invention has the effect of performing the rice cooking operation conveniently and simply and shortening the rice cooking time.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of controlling a rice cooking apparatus comprising a rice cooker into which rice is poured, the method including the steps of:

A) placing the rice cooker onto a turntable; and

B) actuating a motor connected to the turntable to rotate the turntable as the rice is being poured into the rice cooker to evenly distribute the rice within the rice cooker, wherein step B includes the sub-steps of:
   setting the initial values of parameters for controlling the pouring of the rice into said rice cooker;
   determining whether rice is being poured into said rice cooker;
   determining whether the number Turn-Count of rotations of a motor is a first preset value, when it is determined that the rice is not being poured into said rice cooker; and
   stopping said motor when it is determined that the number Turn-Count of rotations of said motor is a second preset value.

2. The method according to claim 1 wherein step B comprises rotating the turntable alternately in clockwise and counterclockwise directions.

3. The method according to claim 2, further including, between steps A and B, the step of actuating the motor to rotate the turntable to place the rice cooker in a predetermined normal position prior to pouring of the rice.

4. The method according to claim 1 wherein during step B, the rice cooker emits signals received by a controller operatively connected to the motor.

5. A method of controlling a rice cooking apparatus comprising a rice cooker into which rice is poured, the method including the steps of:

A) placing the rice cooker onto a turntable; and

B) actuating a motor connected to the turntable to rotate the turntable as the rice is being poured into the rice cooker to evenly distribute the rice within the rice cooker, wherein step A includes the sub-steps of:
   setting initial values of parameters for controlling the placing of said rice cooker, and rotating a motor to rotate said rice cooker;
   determining whether a duration Time-Interval of a high level optical signal emitted from a stationary housing is a predetermined time;
   determining whether the optical signal emitted from said housing is at a high level, when it is determined that the high level duration Time-Interval of the optical signal emitted from said housing is the predetermined time;
   allowing said housing to emit no optical signal, when it is determined that the optical signal emitted from said housing is at a high level;
   setting an initial value of the high level duration Time-Interval of the optical signal emitted from said housing to zero;
   determining whether the optical signal received at said housing is at a high level;
   determining whether the number In-Count of optical signals received at said housing is a predetermined value, when it is determined that the optical signal received at said housing is at a high level; and
   stopping said motor when it is determined that the number In-Count of optical signals received at said housing is the predetermined value.

6. A method of controlling a rice cooking apparatus, as set forth in claim 1, wherein step B further includes the sub-steps of:

determining whether the number Turn-Count of rotations of said motor is a predetermined maximum value, when it is determined that the rice is being poured into said rice cooker;

determining whether said motor is rotating in the normal direction, when it is determined that the number Turn-Count of rotations of said motor is not the predetermined maximum value; and incrementing the number Turn-Count of rotations of said motor by one when it is determined that said motor is rotating in the normal direction, and continuing to rotate said motor in the normal direction.

7. The method according to claim 5 wherein step B comprises rotating the turntable alternately in clockwise and counterclockwise directions.

8. The method according to claim 7, further including, between steps A and B, the step of actuating the motor to rotate the turntable to place the rice cooker in a predetermined normal position prior to pouring of the rice.

9. The method according to claim 5 wherein during step B, the rice cooker emits signals received by a controller operatively connected to the motor.

* * * * *